United States Patent
Malamut et al.

(10) Patent No.: US 11,748,211 B2
(45) Date of Patent: Sep. 5, 2023

(54) AUTOMATIC UPDATE OF NETWORK ASSETS USING GOLD IMAGES

(71) Applicant: EMC IP Holding Company LLC, Hopkinton, MA (US)

(72) Inventors: Mark Malamut, Aliso Viejo, CA (US); Arun Murti, Mission Viejo, CA (US); Stephen Smaldone, Woodstock, CT (US)

(73) Assignee: EMC IP Holding Company LLC, Hopkinton, MA (US)

(*) Notice: Subject to any disclaimer, the term of this patent is extended or adjusted under 35 U.S.C. 154(b) by 268 days.

(21) Appl. No.: 17/174,881

(22) Filed: Feb. 12, 2021

(65) Prior Publication Data

US 2022/0197757 A1     Jun. 23, 2022

Related U.S. Application Data

(63) Continuation-in-part of application No. 17/124,957, filed on Dec. 17, 2020, now Pat. No. 11,513,904.

(51) Int. Cl.
*G06F 11/14* (2006.01)
*G06F 8/61* (2018.01)

(52) U.S. Cl.
CPC .......... *G06F 11/1469* (2013.01); *G06F 8/63* (2013.01); *G06F 11/1435* (2013.01); *G06F 11/1451* (2013.01); *G06F 11/1464* (2013.01); *G06F 11/1484* (2013.01)

(58) Field of Classification Search
CPC .... G06F 11/1469; G06F 8/63; G06F 11/1435; G06F 11/1451; G06F 11/1464; G06F 11/1484
See application file for complete search history.

(56) References Cited

U.S. PATENT DOCUMENTS

| | | | | |
|---|---|---|---|---|
| 9,063,815 B2* | 6/2015 | Kundu | ...................... | G06F 8/63 |
| 2009/0328030 A1* | 12/2009 | Fries | ........................ | G06F 8/63 |
| | | | | 717/174 |
| 2012/0216052 A1* | 8/2012 | Dunn | ...................... | G06F 21/78 |
| | | | | 713/193 |
| 2013/0212579 A1* | 8/2013 | Ben-Shaul | .......... | G06F 9/45533 |
| | | | | 718/1 |
| 2015/0089493 A1* | 3/2015 | Goel | ................... | G06F 9/45558 |
| | | | | 718/1 |
| 2017/0139697 A1* | 5/2017 | Antony | ...................... | G06F 8/60 |
| 2017/0139731 A1* | 5/2017 | Antony | ...................... | G06F 8/63 |
| 2017/0322815 A1* | 11/2017 | Buswell | ..................... | G06F 8/63 |
| 2018/0253320 A1* | 9/2018 | Emejulu | ................... | G06F 8/63 |
| 2019/0163460 A1* | 5/2019 | Kludy | ................... | H04L 9/3263 |

(Continued)

*Primary Examiner* — Merilyn P Nguyen
(74) *Attorney, Agent, or Firm* — Staniford Tomita LLP

(57) ABSTRACT

Automatically updating operating system and application programs in a large-scale network using Gold image data. An asset update process receives validation by a user for use of an updated program comprising new Gold image data. The process automatically updates the previous version of the updated version with the updated program to generate new user content data, without requiring further user intervention by using a defined tag linking the new Gold image data with previous Gold image data for the older version of the program. The Gold image data is stored in a central data protection target storage separate from data protection target storage for the user content data.

11 Claims, 12 Drawing Sheets

(56) References Cited

U.S. PATENT DOCUMENTS

2020/0125352 A1\* 4/2020 Kannan ................. G06F 8/65
2020/0364039 A1\* 11/2020 Gibbs .................. G06F 8/71
2023/0027329 A1\* 1/2023 Durham ............... H04L 9/0631

\* cited by examiner

200

| | 202 | 204 | 206 |
|---|---|---|---|
| | OPERATING SYSTEM | WINDOWS | Kernel Interfaces, Drivers Data Structures |
| | | LINUX | Kernel Interfaces Drivers Data Structures |
| | APPLICATIONS | DATABASE (e.g., SQL) | Data Structures APIs, Scripts/Macros |
| | | DATABASE (e.g., Oracle) | Data Structures APIs, Scripts/Macros |
| | | E-MAIL | Data Structures APIs, Scripts/Macros |
| | | WORD PROCESSOR | Data Structures APIs, Scripts/Macros |

FIG. 2

900 GOLD IMAGE LIBRARY CATALOG

| ASSET/COMPONENT LIST 902 | SystemType 904 | SystemTypeDate 906 |
|---|---|---|
| Windows Server 2012<br><br>SQL Server 2008 | SQL_SERVER | 5/12/2010 |
| Windows Server 2015<br><br>SQL Server 2010 | SQL_SERVER | 8/14/2012 |
| Linux SLES 13 sP2<br><br>Oracle 11I | SLES_ORACLE | 2/5/2016 |

FIG. 9

920 DEPLOYED IMAGE CATALOG

| ASSET NAME | SystemType | SystemTypeDate |
|---|---|---|
| Production_sql_server | SQL_Server | 5/12/2010 |
| marketing_db | SQL_Server | 5/12/2010 |
| inventory_data | SQL_Server | 5/12/2010 |
| order_db | SQL_Server | 8/14/2012 |

AUTOMATIC UPDATE OF NETWORK ASSETS USING GOLD IMAGES

CROSS-REFERENCE TO RELATED APPLICATIONS

The present application is a Continuation-In-Part application and claims priority to U.S. patent application Ser. No. 17/124,957 filed on Dec. 17, 2020, entitled "Gold Image Library Management System to Reduce Backup Storage And Bandwidth Utilization," now issued as U.S. Pat. No. 11,513,904 on Nov. 29, 2022, and assigned to the assignee of the present application.

TECHNICAL FIELD

This invention relates generally to computer backup systems, and more specifically to automatically updating programs and files using Gold image directed to a single target.

BACKGROUND

Large-scale networks process and store large amounts of user data created by different applications and often deployed on different machines and operating systems (OS). Routine backing up of data is a critical task for any enterprise or organization, and well established products, such as DellEMC's Data Domain system are often used for providing deduplicated backup and restoration functions. Backing up large-scale network data involves backing up both the growing and changing (dynamic) user data as well as the relatively static OS and application data, structures, and definitions.

Customers often deploy a set of standard server configurations known as 'Gold images' multiple times. These Gold images may be pure OS images or they may be application/OS combinations such as a SQL Server on MS-Windows, Oracle on Linux, and so on. Gold image data is static (structural/definition) data that is deployed many times by users who wish to reuse the same code across many different deployed computers or machines. As these Gold images are placed into service (deployed) in user production systems, they help generate user content data, which is subject to data protection processes that store the Gold image data along with the user data.

Because of the sheer amount of data stored today and the increasing cost of computing resources, one of the key goals of data protection is to reduce the amount of data protection storage resources that are consumed. Present systems typically back up the Gold image (OS/application structural) data along with the content data simultaneously and at regular intervals. Because the Gold image data is static and deployed many times (e.g., used by many VMs) as compared to the more dynamic content data, repeated and regular storage of this Gold image data represents a large element of duplicated and wasted storage and processing resources.

Upgrading of assets (e.g., VMs, physical machines, etc.) is also challenging for network users. Although most software components such as operating systems (e.g., Windows, Linux) and applications (e.g., SQL Server, Oracle) support some level of automatic upgrading, some level of user interaction is almost always required. Additionally, customers often desire to test and control the versions of multiple components that they are ready to deploy as opposed to simply accepting the latest release from their various software vendors.

What is needed, therefore, is an automatic process of updating assets in a large-scale distributed network.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 illustrates a table showing a composition of a Gold image library storing OS and application data, under some embodiments.

FIG. 9 is a table illustrating an example Gold image library.

FIG. 10 is a table illustrating an example deployed image catalog.

DETAILED DESCRIPTION

Figure 1:
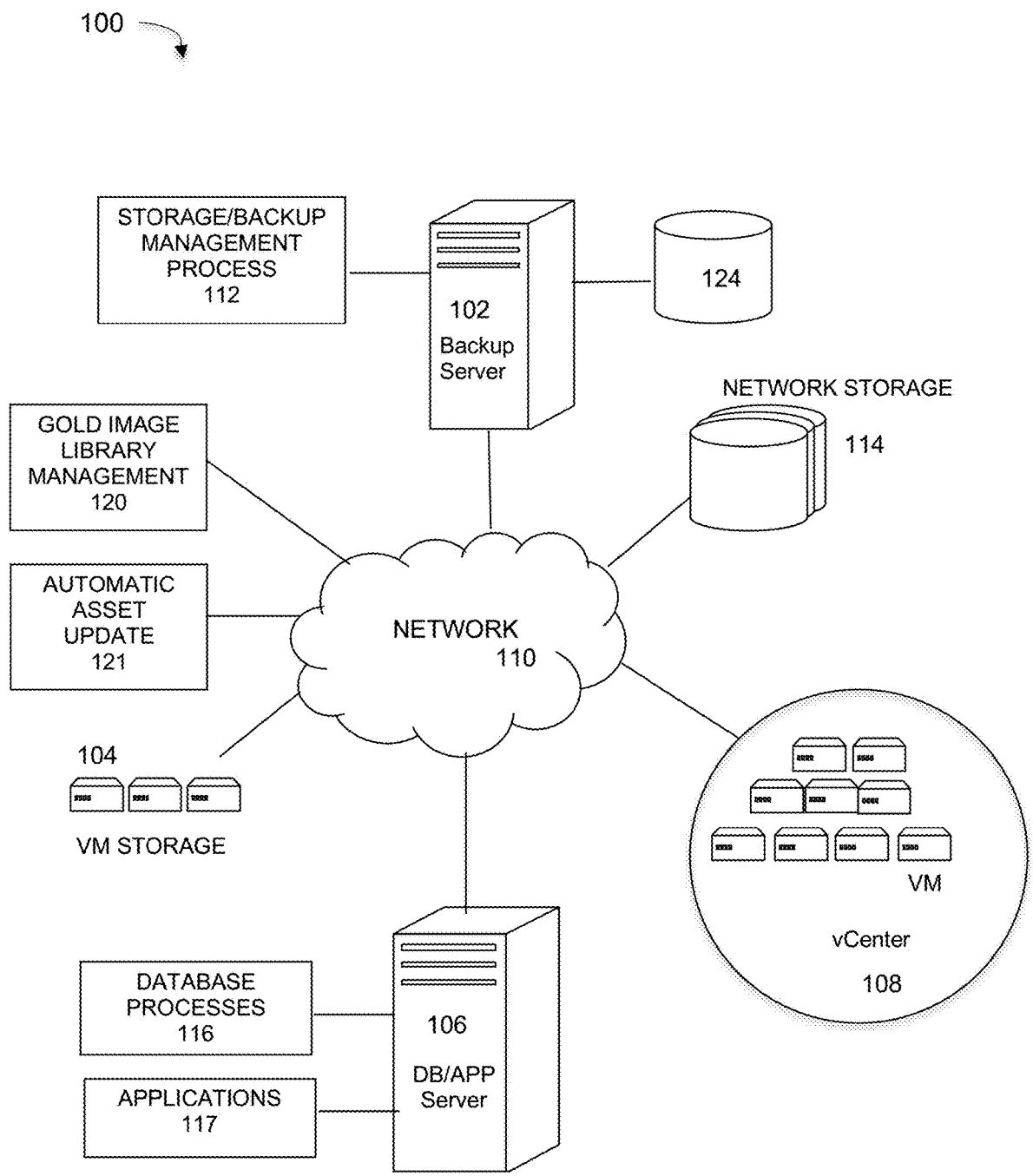
FIG. 1 is a diagram of a network implementing a Gold image library management system for data processing systems, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a Gold image library management system in which network assets (VMs, physical machines, etc.) are automatically updated without requiring any user interaction. The use of Gold images allows users to certify certain versions and/or combinations of software such as OSs and applications (e.g., Windows 2012 with SQL Server 2008 R2). Using a common data protection target, users direct their library of Gold Images to a single target, and this is used to implement automatic upgrading of assets to newer and customer certified versions of components in combination (Gold images).

FIG. 1 is a diagram of a network implementing a Gold image library management system for data processing systems, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The database 116 and other applications 117 may be executed by any appropriate server, such as server 106. Such servers typically run their own OS, such as MS Windows, Linux, and so on. The operating systems and applications comprise program code that defines the system and applications. As such, this code comprises data that is backed up and processed by backup server 102 during routine data protection backup and restore processes that involve all of the data of system 100.

The application and OS data are well defined by the manufacturers of these programs and comprise all the program data prior to or minus any user data generated by a user using the application or OS. This structural, non-content data is referred to as "Gold image" data because it is core data related to the structure, operation, and deployment of the applications and operating systems, rather than user-generated data. For example, Gold image data may comprise kernels, interfaces, file systems, drivers, data element definitions, macros, scripts, configuration information, and other data that comprises the software 'infrastructure' of the system, rather than the software content of the system. Such data generally does not change over time, as applications, and operating systems are revised or upgraded relatively infrequently, certainly when compared to user content additions or revisions. The application and OS data only needs to be updated when new versions are introduced, or when patches, bug fixes, drivers, virus definitions, and so on are added.

In current data processing and backup systems, Gold image data is treated as integrated with or closely coupled to the actual user content data, and is thus backed up and restored as part of an entire body of data that mixes the infrastructure data with the content data of the system. In many cases, this can greatly increase the total amount of data that is subject to backup and restore processes of the system. Thus, current data protection schemes use a one-to-one relationship in which data sources are backed up to a single data protection target. They do not define or use dual or multiple targets, that is, one for base (Gold image) data and a separate one for operational data (content data).

In an embodiment, Gold image data is maintained or stored in a Gold image library that defines a set of protected base image that can be shared among stored content data sets, but that is kept separate from those more dynamic data sets as they are processed routinely by the backup and restoration processes.

FIG. 2 illustrates a table 200 showing a composition of a Gold image library storing OS and application data, under some embodiments. As shown in table 200, the Gold image library comprises a repository storing base data for fundamental system programs, such operating systems and applications, as well as any other infrastructural programs. Column 202 lists the one or more operating systems, and the one or more different applications. Any number of different operating systems and applications may be used, and the example of table of FIG. 2 two different operating systems (Windows and Linux) and four example applications: SQL and Oracle databases with e-mail and word processing applications, as listed in column 204. The data elements in column 206 of table 200 represent the various programs, software definitions, and data for elements of the operating systems and applications that are written or defined by the manufacturer and sold or provided to the user under normal software release or distribution practices. FIG. 2 is intended only to provide an example Gold image library, and embodiments are not so limited. Any structure or data composition may be used to define and store the Gold image data comprising the data system.

The base or system data stored in the Gold image library, such as in table 200 comprises a base set of protected data that is stored separately from the user content data that is generated by the deployment and use of the operating systems and applications 204. In an embodiment, system 100 includes a Gold image library management component or process 120 that centralizes and stores the Gold image data when it is needed, rather than on the constant basis imposed by the backup management process 112. By using this central repository, a nearly infinite number of deployed instances of these Gold Images can be protected and thereby reduces the overall data protection footprint.

For the embodiment of FIG. 1, the Gold image library manager 120 may be implemented as a component that runs within a data protection infrastructure, and can be run as an independent application or embedded into an instance of data protection software 112 or a data protection appliance. Any of those implementations may be on-premise within a user's data center or running as a hosted service within the cloud 110.

As shown in FIG. 1, in a typical user environment there are a collection of a clients that consist of VMs and/or physical machines. Typically, larger users will create a set of Gold images that they use repeatedly as the baseline for these clients so as to standardize their OS and application deployments. For example, a Gold image library may include Microsoft (MS) Windows 2012 plus SQL Server 2008, MS Windows 2016 plus SQL Server 2017, SLES 12 plus Oracle 8i, or any other combinations that users choose to use as their set of standard deployments. By reusing these standard Gold images, customers can speed up the deployment of clients and certify these deployments for security or other reasons. Users may deploy these Gold images many tens or hundreds of times. The more often a standard deployment can be used, the more control users can exercise over their environment.

Figure 3A:
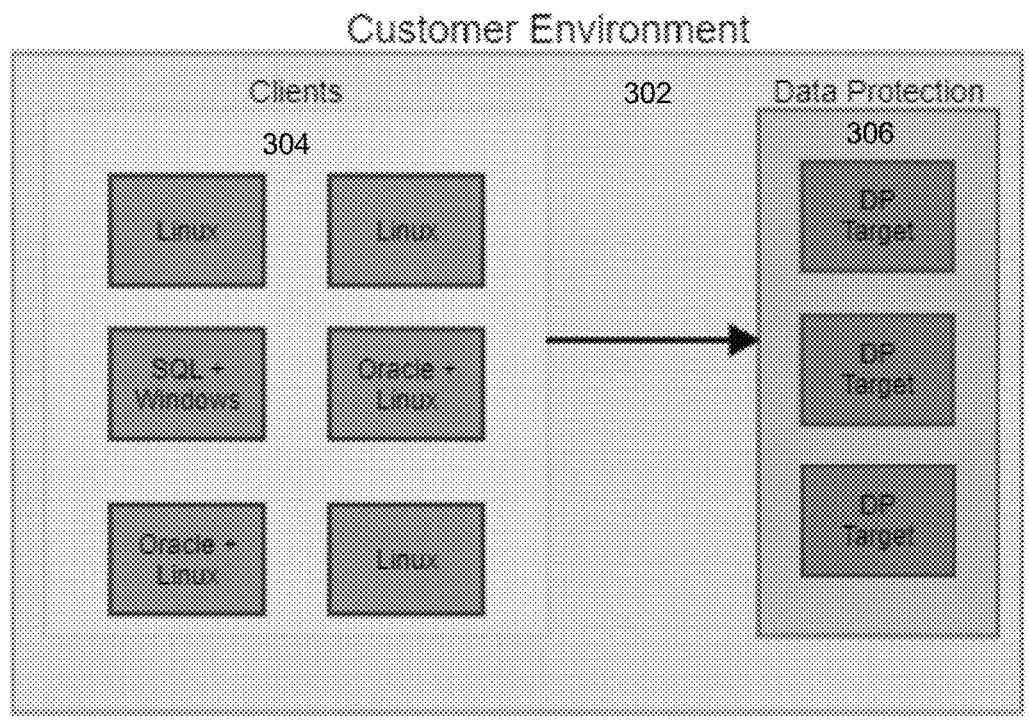
FIG. 3A illustrates an example user environment with VM clients running various OS and database application combinations for protection on a single data protection (DP) target set.

A data protection system for protecting deployed systems can be built in a variety of ways. FIG. 3A illustrates an example user environment with VM clients running various OS and database application combinations for protection on data protection (DP) clients, and that implements a Gold library management process, under some embodiments. As shown in FIG. 3A, user (or 'customer') environment 302 includes a number of clients 304 each comprising a machine running an OS, application, or combination OS plus application. The clients 304 represent data sources that are used and ultimately produce data for backup to data protection targets or storage devices 306. This represents what may be referred to as a 'production' environment.

Figure 3B:
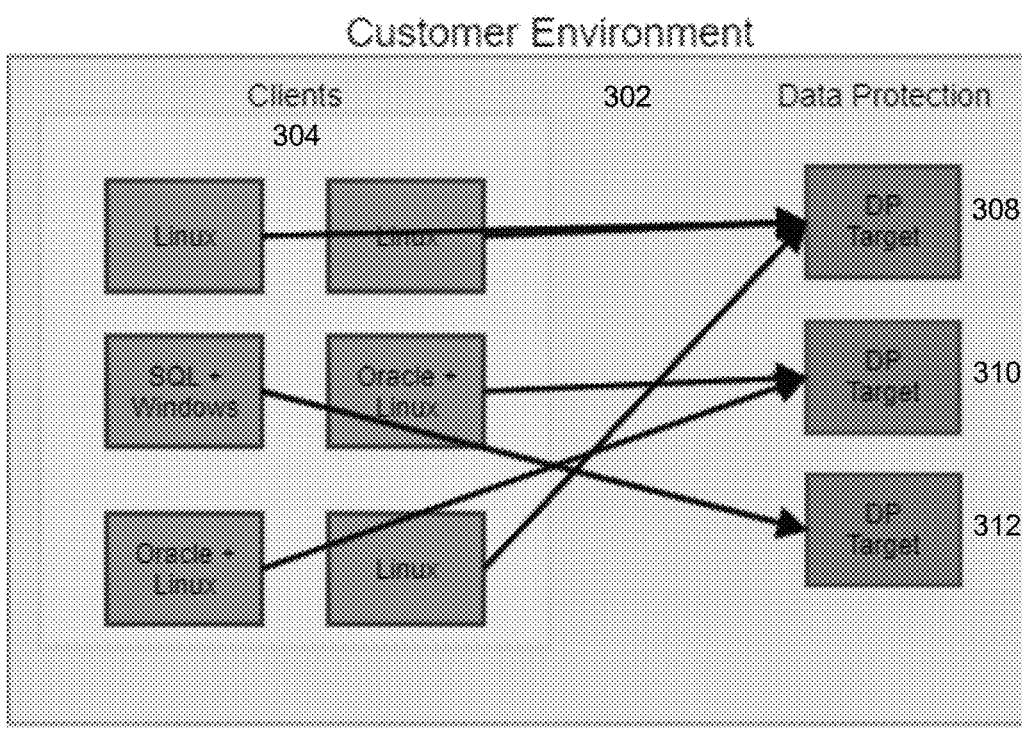
FIG. 3B illustrates an example user environment with VM clients running various OS and database application combinations for protection on individual data protection (DP) targets.

For the example of FIG. 3A, three of the clients are Linux only clients, while others are a combination, such as Windows plus SQL or Linux plus Oracle, and so on. The data from these clients is stored in one or more data protection targets that may be provided as a single logical data protection target 306 as shown in FIG. 3A. Alternatively, the data protection targets may be provided as individual data protection targets, as shown in FIG. 3B. Thus, as shown in the example of FIG. 3B, certain OS and application clients are backed up to DP target 308, others are backed up to DP target 310, and the remainder are backed up to DP target 312. In one embodiment, a DP target may be implemented as a Data Domain Restorer (DDR) appliance or other similar backup storage device.

The base OS and/or application data for each client 304 without any user content data comprises a Gold image for that client, and is typically stored along with the user content data in an appropriate DP target. As stated earlier, however, this Gold image data is static but is yet stored repeatedly based on the DP schedule for the user content data. Due to this reuse of Gold images by users, there typically is a substantial amount of duplicate data that ends up in a data protection environment. In an attempt to minimize this duplication of data, user presently may assign all data sources that use the same Gold image or images to a single data protection target. Doing such requires a significant amount of customer management, and can become difficult to manage and maintain over time as data sources expand and need to be migrated to new data protection targets.

To eliminate or at least alleviate the amount of duplicated data stored across multiple DP targets when Gold image is protected, the Gold image library management system 120 uses a common dedicated DP target for the protection of Gold images. Each regular DP target can then deduplicate its own data against this common DP target to save only new Gold image data rather than repeatedly re-storing existing Gold image data with the user content data on DP targets. This process effectively adds another deduplication function on any user data deduplication process provided by the DP system, and helps eliminate all or almost all sources of duplicate data storage.

Figure 4:
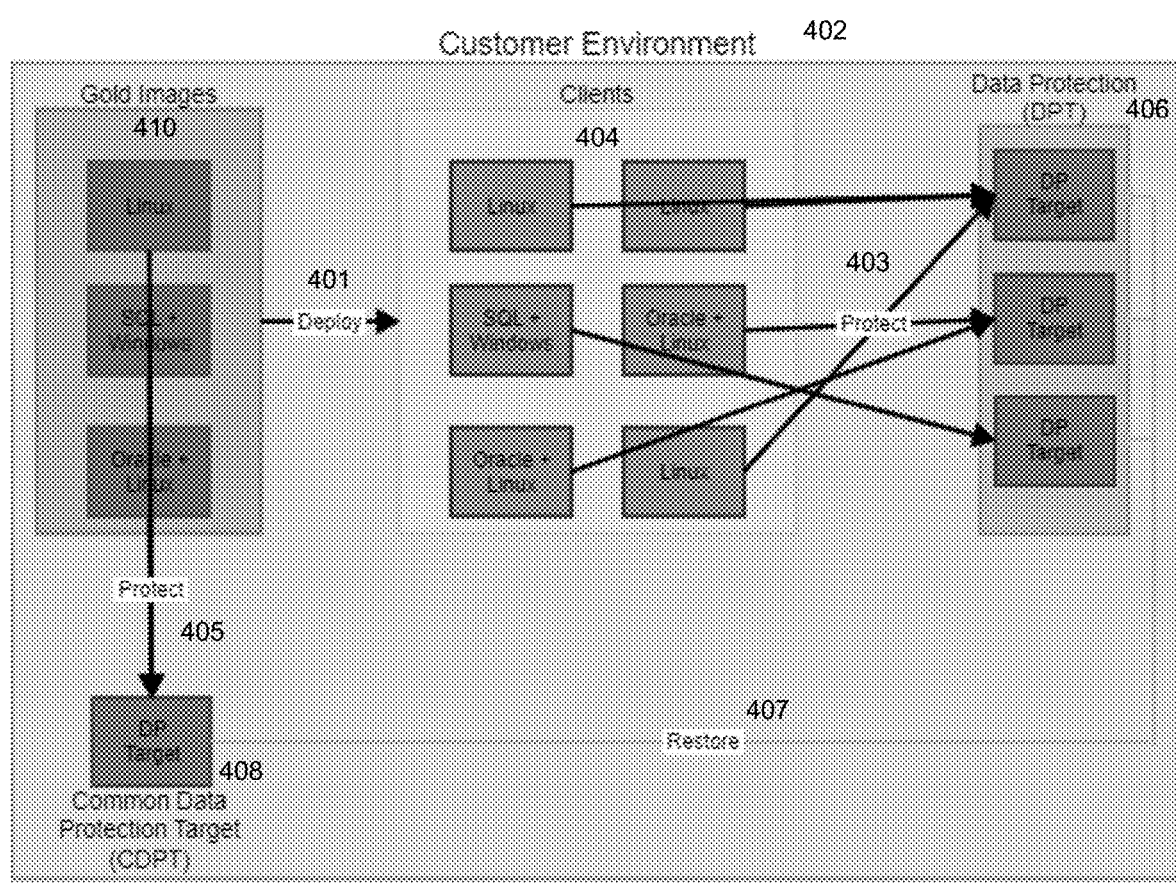
FIG. 4 illustrates a common data protection target (CDPT) storing Gold image data for network clients, under some embodiments.

FIG. 4 illustrates a common data protection target (CDPT) storing Gold image data for network clients, under some embodiments. As shown in FIG. 4, user environment 402 includes different OS and application clients 404 with their user content data stored in DP targets 406 under an appropriate protection scheme 403, as described above. The Gold images 410 comprise the base code for each of the OSs and applications that are implemented on the clients through a deployment operation. When an OS and application are deployed 401, they are loaded onto appropriate physical or virtual machines and configured or instantiated for use by the user to generate content data that is then periodically stored through protection process 403 onto data protection targets 406. For this embodiment, the Gold images are not stored with the client data in DP protection storage 406. Instead, the user environment 402 includes a Common Data Protect Target (CDPT) system 408 that stores only the Gold images 410 through its own protection process 405.

During a normal backup process, the regular DP protection storage 406 will store the user content data (usually deduplicated), and will query the CDPT to determine if the Gold image data for the OS and applications for the clients resides in the CDPT. If so, the DP target 406 system will leverage that previously and centrally stored 408 data instead of storing it in the general purpose data protection target 406. This will facilitate a savings in the overall size of the data protection environment. In system 402, the DP target system 406 is provided as storage devices for storing user content data generated by one or more data sources deployed as clients running one or more operating system and application programs. The CDPT 408 is provided as storage devices accessible to but separate from the DPT storage 406 for storing Gold image (structural) data for the one or more operating system and application programs.

Figure 6:
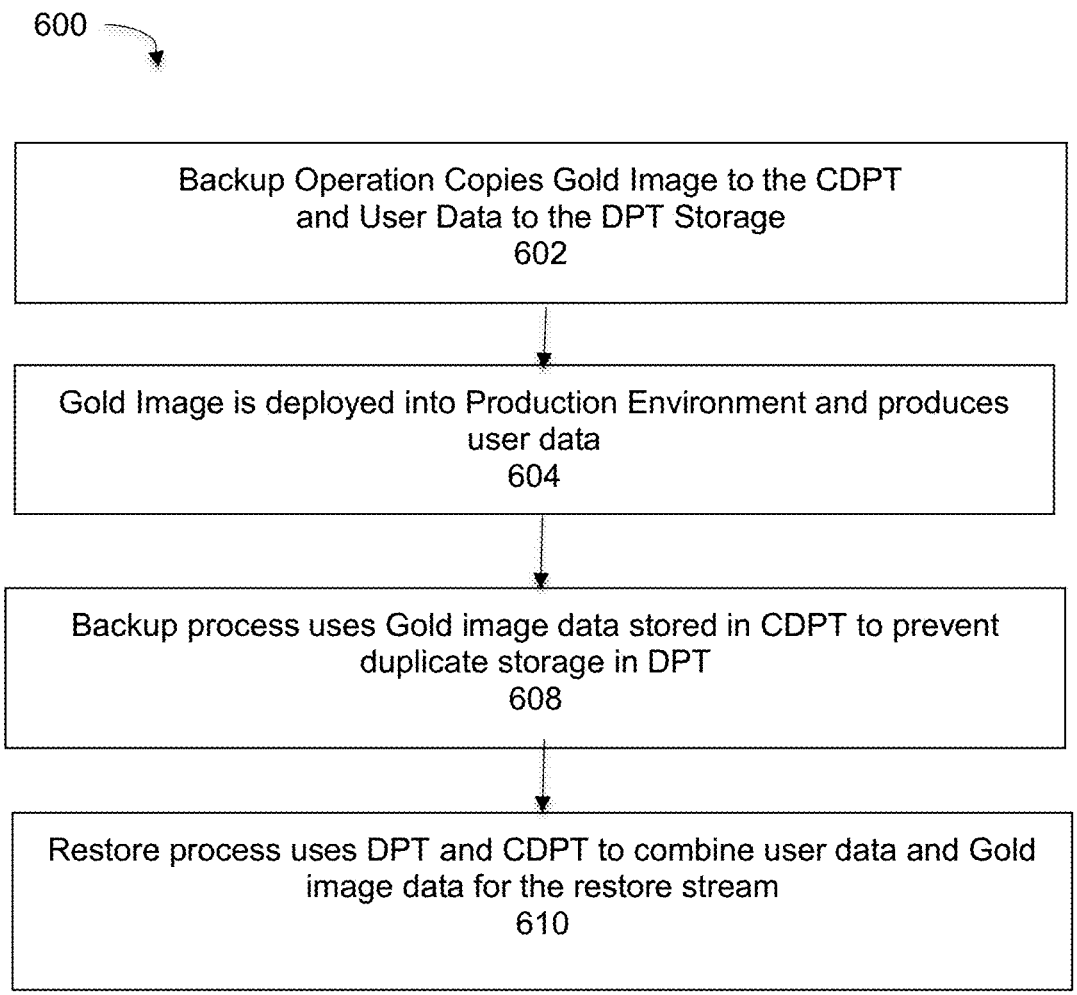
FIG. 6 is a flowchart that illustrates an overall method of using a CPDT to store Gold image data for data protection, under some embodiments.

FIG. 6 is a flowchart that illustrates an overall method 600 of using a CPDT to store Gold image data for data protection, under some embodiments. As shown in FIG. 6, Gold images are first backed up to the CDPT, 602. This is done in a backup operation 521 that also backs up content data from the client VM to the data protection storage (DPT). The Gold image is then deployed and placed into the production environment, typically comprising one or more VMs (e.g., 108), and starts producing user data, 604. During normal data protection backup operation, the user data from the VMs is copied to DP targets in the backup operation of 602. In previous systems, this backup would copy all files including user content and Gold image data from the client VMs to the DP targets. If the same Gold image data is deployed on many VMs, the DP targets would store a great deal of redundant data. For the embodiment of FIG. 6, the backup process instead uses the single Gold image data stored in the centralized CDPT to prevent this duplicate storage of the Gold image data in the DP targets, 608. When the data protection process involves a data restored from the DP targets back to the original or different VMs, the restore process simply involves combining the user data from the DP targets with the Gold image data from the CDPT to form the restore stream, 610.

Method 600 of FIG. 6 uses certain chunk data structures stored in the DP targets 406 and CDPT 408 to reference stored Gold image data that is used for the content data stored in the DP targets. The CDPT stored Gold image data is referenced in the DP targets to prevent redundant storage of this data in the DP targets, since it is already stored in the DCPT. During a backup operation, the DP target queries the CDPT to determine if the Gold image data for the client already exists in the CDPT. If it does already exist, the DP target will not store the Gold image data in the DP target, but will instead use the reference to indicate the location of the Gold image data corresponding to the backed up user content data. Backups of the production VM will look to see if the data exists on the DP target. If it does not exist there, then the CDPT is checked for the data. If it exists on the CDPT a remote chunk is created. If it does not, then a regular local chunk is created.

In a standard data protection storage system, the stored data is saved in a chunk data structure comprising the data itself, a hash of the data, and a size value. In general, files for the Gold image data are different from the files for the user content data. Thus, the data stored in a data structure for the Gold image data is separate and distinguishable from the data stored in the data structures for the content data.

Figure 5A:
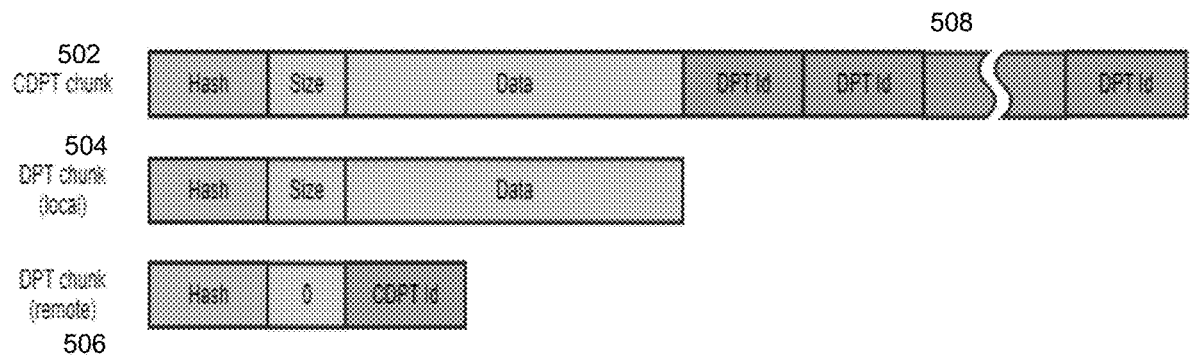
FIG. 5A illustrates a chunk data structure for storing content and Gold image data, under some embodiments.

FIG. 5A illustrates a chunk data structure for storing content and Gold image data, under some embodiments. As shown in FIG. 5A, DPT chunk 504 for each client 404 storing data in DP targets 406 comprises the Hash_Size_Data for each client instance in a data structure, as shown. This is referred to as a 'local' chunk with respect to the DPT storage 406 and stores the data for files comprising the content data for respective VM clients. The Size field in local DPT chunk 504 is always a non-zero value as it represents the size of the data that is stored locally on the DP target. Thus, local chunks stored in the DPT will have a non-zero size field and chunk data.

In order to support the use of the CDPT 408, the chunk data structure is augmented as shown for data structure 502. The CDPT chunk 502 comprises the hash, size, and data, and also a list of zero or more DPT IDs 508. Each entry in this DPT ID list will refer to a specific DP target that references a particular chunk. As there is no reference counting, this DPT ID list will contain a DPT ID either zero or one time exactly. A DPT ID 508 can be a standard device ID, such as a universally unique identifier (UUID) or similar.

The remote DPT chunk 506 is stored in the DP target 406 and refers to a remote chunk on a CDPT device. In this chunk data structure, the Size field is zero, as it references the remote CDPT through the CDPT ID for the CDPT device where the chunk data resides. The Gold image data stored in the CDPT target 408 is thus referenced within the DP target by remote DPT chunk data structure 506 that comprises a hash, a zero Size field, and the CDPT ID. FIG. 5A illustrates different variants of the chunk data structure based on its location, i.e., stored in the DPT or CDPT. Thus, on the DP target, the local DPT chunk 504 Size field is always non-zero and indicates the size of the data stored locally on the DP target, while the remote DPT chunk 506 Size field is always zero as there is no data stored locally for the Gold image, since it is store remotely on the CDPT as the CDPT chunk 502.

Figure 5B:
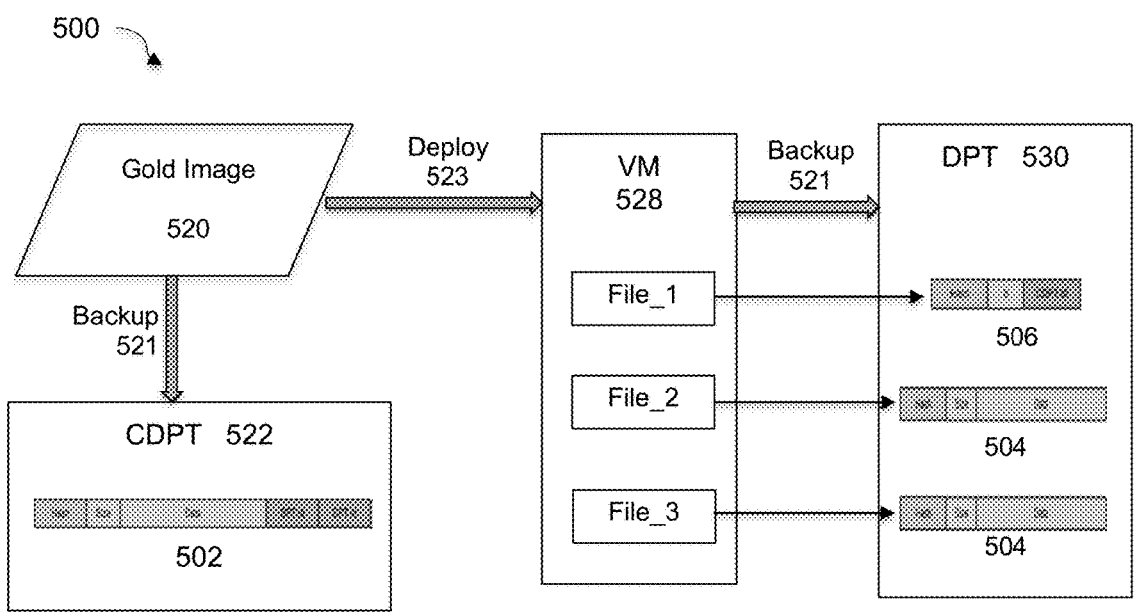
FIG. 5B illustrates storage of chunk data structures in the CDPT and DPT, under some embodiments.

FIG. 5B illustrates storage of chunk data structures in the CDPT and DPT, under some embodiments. As shown in system 500, Gold image data 520 is stored in CDPT 522 during backup operation 521. This backup operation also copies content data from VM client 528 to DPT storage 530. The data structure storing this data uses the CDPT chunk data structure 504 of FIG. 5A. This Gold image is then deployed 523 to client VM 528. During use of the OS and applications of the Gold image, certain user data is generated, thus deployment and use generates several files, denoted File_1, File_2, File_3, and so on. In the example of FIG. 5B, File_1 comprises the Gold image data for Gold image 520, while the other files (File_2 and File_3) are content data files. During a backup operation 521, these files are copied to DP target 530 for storage. The content data for files File_2 and File_3 are stored in the DPT using the DPT chunk data element (local) 504 of FIG. 5A. The Gold image data of File_1 is already stored in CDPT 522 in chunk data structure 502, thus it does not need to be stored again in DPT 530. Instead, the Gold image data is referenced within DPT 530 though DPT chunk (remote) 506, indicating that the Gold image data for VM 528 is available remotely in CDPT 522. In this case, the Gold image data of File_1 is only stored as a hash value and a CDPT ID referencing CDPT 522. The size field is set to '0' indicating that no data is stored for File_1. This prevents redundant storage of the data in CDPT chunk data structure 502. With respect to the CDPT chunk data structure 502 stored in CDPT 522, the DPT ID fields 508 contain the identifiers for DPT 530 and any other DP targets (not shown) that may reference this Gold image data.

Figure 7A:
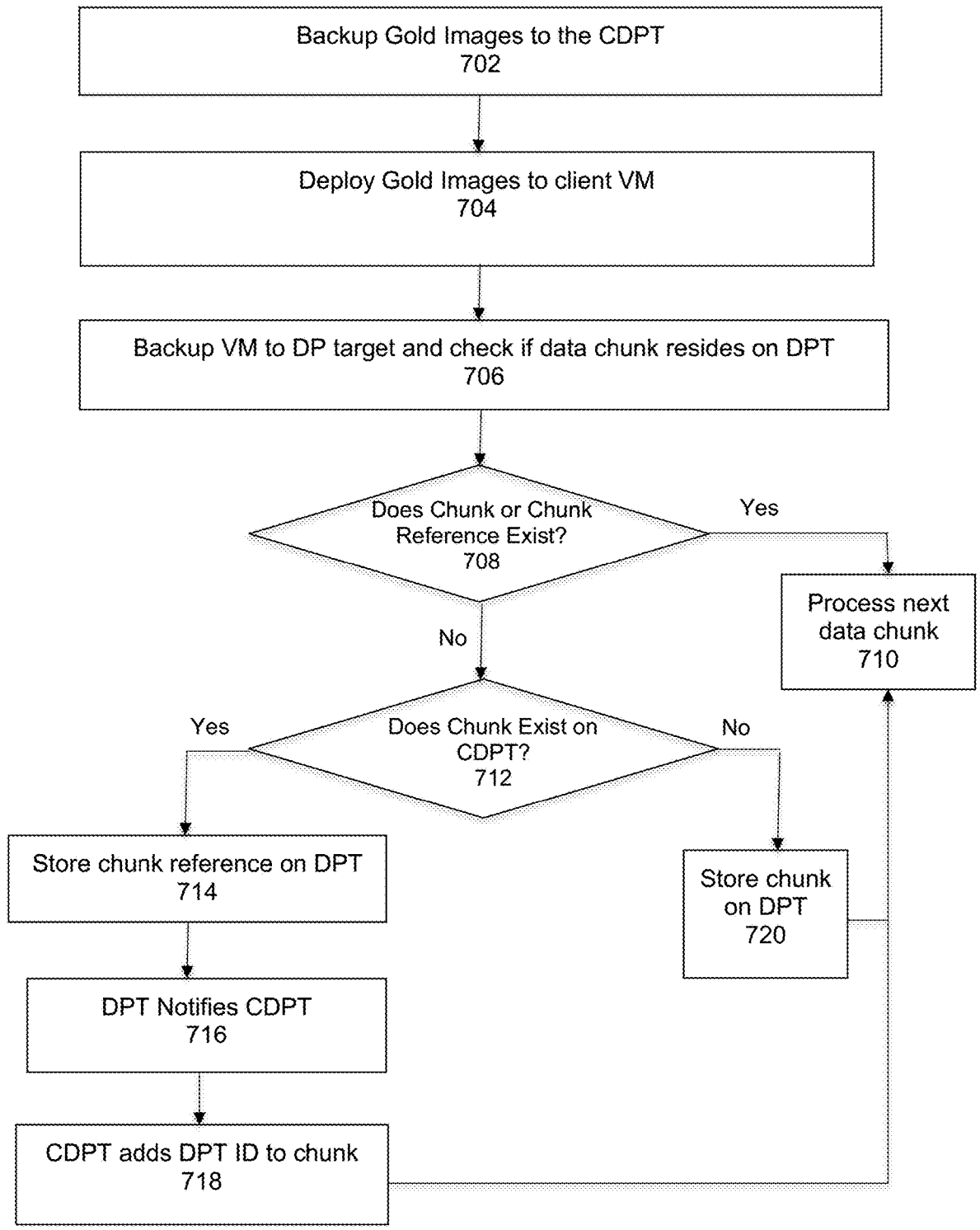
FIG. 7A is a flowchart that illustrates a backup process using a common data protection target for Gold images, under some embodiments.

FIG. 7A is a flowchart that illustrates a backup process using a common data protection target for Gold images, under some embodiments. As shown in FIG. 7A, Gold images are backed up to the CDPT 408 as part of the data protection operation, 702. In step 704, the Gold image is deployed by the user to the client. The data protection operation also backs up the client VM to the DP target 406. Upon backup, the process checks to see if a data chunk or data chunk reference for this backed up data already resides on the DPT, 706. If, in step 708, it is determined that the chunk data or the chunk reference exists on the DPT, the next data chunk is processed in loop step 710. If, in step 708, it is determined that the chunk or chunk reference does not exist on the DPT, the process next determines whether or not the chunk exists on the on the CDPT 408, as shown in decision block 712. If the chunk does not exist on the CDPT, the data chunk is stored on the DPT, step 720, and the next data chunk is processed, 710.

If, in block 712 it is determined that the chunk does exists on the CDPT, the process stores the chunk reference on the DP target containing only the chunk's hash, the identifier of the CDPT where the data resides and a size of zero, 714 (signifying an empty data field in this case). The DP target will then notify the CDPT that the chunk is being used and provides the ID of the DP target, 716. The CDPT will then add the ID of the DP target to the chunk on the CDPT, 718, and the next data chunk is then processed, 710. Each data chunk on the CDPT is augmented with a data structure that has a list of identifiers for each regular DP target (DPT) that refers to any CDPT chunk one or more times, as shown in FIG. 5A.

During backup, the DP target 508 may either examine the CDPT system 408 for the data in real-time or (as one optimization), land the data locally on the DP target for performance considerations. If a DPT does initially land the data locally, it will retain a list of the hashes that have not yet been examined for existence on a CDPT. This will enable an off-line process to examine a bulk of hashes collectively at a later point in time in order to check if they exist remotely. For hashes found remotely, as described above, the DPT ID is added to the DPT ID list 508 from the chunk on the CDPT (if it is not already in this list). After that is completed, the local DPT chunk 504 has its data portion removed, the CDPT ID is added, and the 'size' field is set to zero.

With respect to restore processing, as data sources age, they typically contain much more private data than the common CDPT data. That is the user content data grows at a much greater rate than the relatively static Gold image data. Therefore the extra access time required to retrieve any remote data related to the baseline Gold image is generally not a major detriment to restore speed.

Figure 7B:
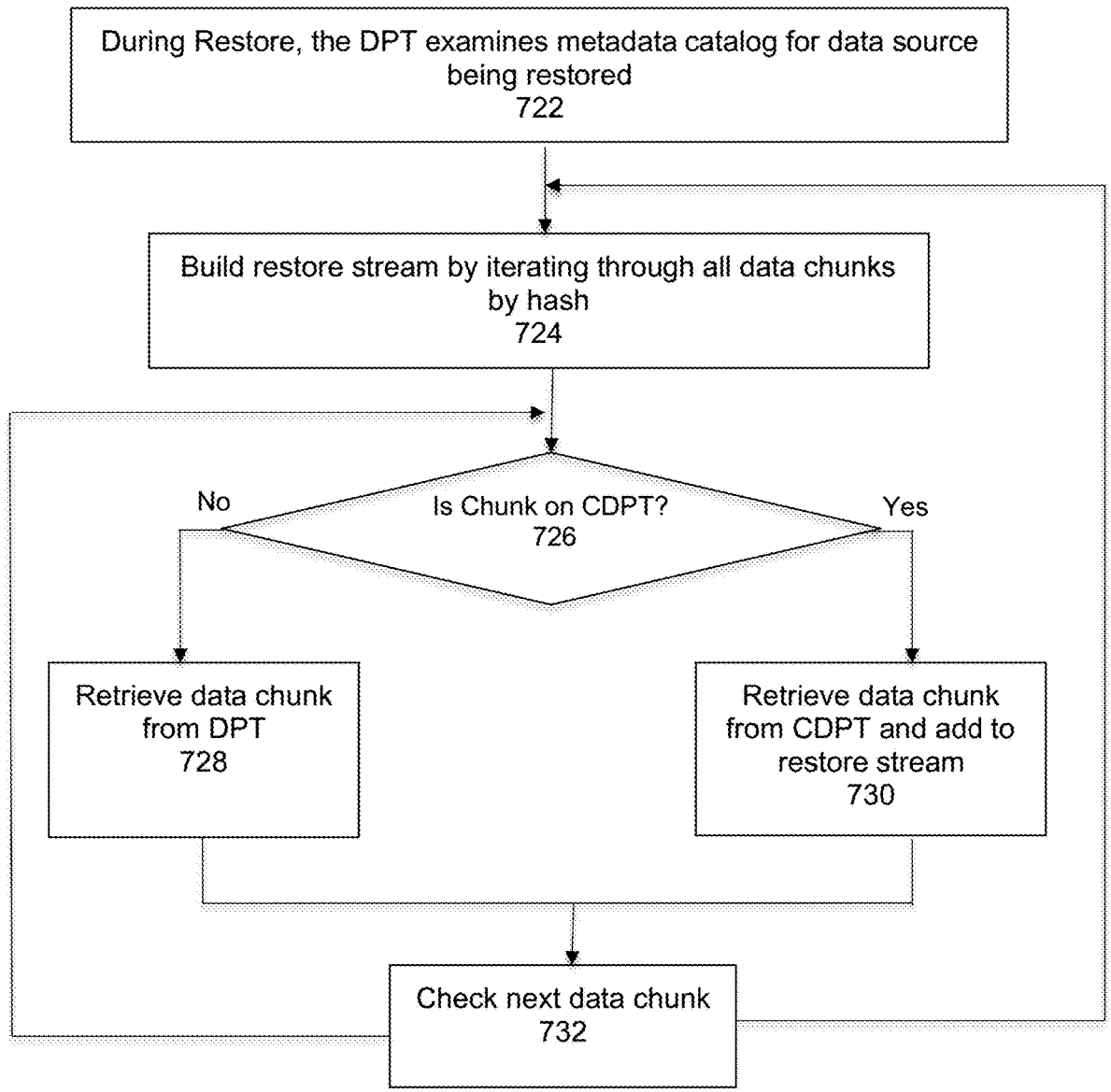
FIG. 7B is a flowchart illustrating a method of performing a data restore operation using a CDPT system, under some embodiments.

FIG. 7B is a flowchart illustrating a method of performing a data restore operation using a CDPT system, under some embodiments. During a restore operation, the DP target 406 examines the metadata catalog for the data source (client) being restored 404, step 722. It will iterate though all of the chunks by hash in order to build the restore stream, 724. If a chunk is not on the CDPT, as determined in step 726, the process will retrieve the data chunk from the DPT 728 check the next data 732. For chunks that are on the CDPT 408, the DP target 406 will retrieve those chunks from the CDPT and use them to add to the restore stream, 730. The next data chunk will then be checked 732.

The Gold image library and CDPT system minimally impacts or even enhances certain garbage collection functions of system 100. In general, garbage collection (GC) is a regularly scheduled job in deduplication backup systems to reclaim disk space by removing unnecessary data chunks that are no longer being referenced by files that were recently modified or deleted. On the DP target system 406, garbage collection is performed as under normal GC procedures to identify and remove unnecessary data chunks. A DPT chunk exists while it is being referenced (regardless if the chunk is local or remote). When there are no longer any references to a chunk detected, the chunk is removed locally. For the embodiment of FIG. 4, this removal is also communicated to the remote CDPT system 408. The CDPT system is given the hash and DPT ID and will remove the DPT ID from that chunk. On the CDPT system, only chunks that have no DPT ID records can be examined for possible garbage collection. For chunks that meet this test, the CDPT system may remove the chunk when there are also no local references. This enables all systems to perform garbage collection nearly independently of each other.

In an embodiment, system 402 of FIG. 4 also implements a CDPT registry. In order for a DP target system 406 to know which CDPT devices 408 it can access, each DP target system will hold a local registry of the valid CDPT systems that it may leverage for remote data. Any practical number of CDPT systems may be used, but in normal system implementations, a single CDPT system will usually be sufficient for most environments.

The CDPT process can be optimized in at least one of several different ways. For example, as the CDPT 408 only contains Gold images that only house static OS and/or installed applications (as opposed to dynamically generated data after a client is entered into service), there is no value to checking the CDPT for data existence after the first backup. There are multiple methods that can assist in this process. One is to build a cache, such as a file cache and/or data cache, when Gold images are backed up to the CDPT 408. When a Gold image is deployed, the caches are also propagated to the deployed instance. The backup software can check these caches and avoid any network traffic for this known static data which resides in the cache. This can apply to every backup of a client. The system only checks data chunks for existence in the CDPT during the first backup as the static data only needs to be checked once. Dynamically building a data cache during backup allows a client to pull a cache (partial or full) from the CDPT.

As another optimization, the restoration process (e.g., FIG. 7B) can retrieve data from two separate locations simultaneously. The Gold image static data can be retrieved from the CDPT 408 while the dynamic data will come from the DP target 406.

Certain DP target post processing steps can be optimized. During a protection operation, clients send their data to the DP target 406. In order to minimize network traffic and complete the backup as quickly as possible, all data lands on the DP target in its fully expanded form (stored as local to a DP target). A list of the hashes that need to be checked are maintained. Periodically, this hash list is queried against the connected CDPT server(s). If the data is found, the local instance is converted to a remote instance and the CDPT registers the DPT as a consumer of the relevant hashes. Similar to the above client optimization, a cache of hashes can be maintained locally which is either build dynamically on the fly or copied periodically from the CDPT.

Another optimization is to use a secondary (common) data protection target that works in conjunction with the regular DP targets 406 in order to minimize duplication of data. This process augment data chunk structures to indicate where data resides (local or remote with the remote's ID). Clients may indicate when a first backup is performed as that is when the highest likelihood of data on a common data protection target will be encountered for the first time. This will avoid unneeded communication with the CDPT and improve performance.

Automatic Update of Assets

In an embodiment, system 100 includes a process or component 121 that implements an automatic asset update process using Gold images. This process automatically updates assets in a large-scale distributed network, and eliminates the need for the user to initiate, execute, manage or otherwise interact with the system to perform the upgrade of CDPT stored program, application, library, or other Gold image data. The function of detection component 121 may be provided as part of the Gold image library management 120 process, or it may be provided as a stand-alone or cloud-based process (as shown). This automatic update process is enabled by the storage of Gold images in a separate data protection target (i.e., CDPT) from the one used for the production data (i.e., DPT).

Figure 8:
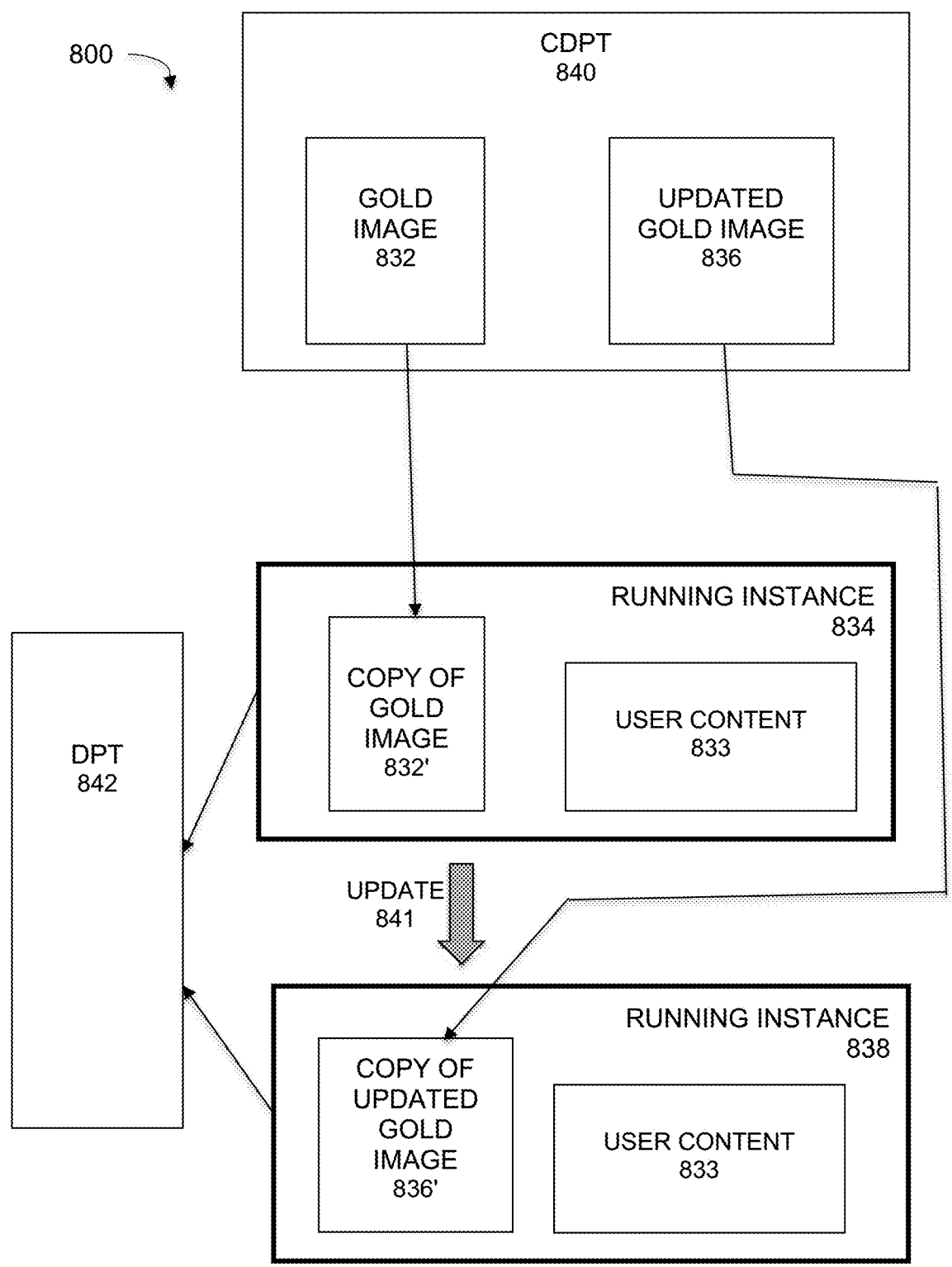
FIG. 8 illustrates the update of Gold image data managed by an automatic asset update process, under some embodiments.

FIG. 8 illustrates the update of Gold image data managed by an automatic asset update process, under some embodiments. As shown in the example scenario of FIG. 8, CDPT 840 holds Gold images, such as Gold image 832 and an updated Gold image 836, among any other number of Gold images. Each Gold image is simply a set of files stored in the system, and in this case in CDPT 840 that comprise an application, operating system, machine, or other asset in the system. By itself, the Gold image data is not a complete executable instance of that asset. The Gold image data must be deployed to produce a compute instance of that asset, such as by copying the Gold image data onto a running machine or compute instance. Thus, as shown in system 800, a copy of Gold image 832 (denoted 832') is copied into running instance 834, which represents a running computer, VM, or other machine. The running instance (or running computer) 834 provides processing resources (e.g., CPU, memory, etc.) so that the Gold image bits perform actual work, such as running a database server, and so on.

As the program code of Gold image copy 832' is executed, it generates user content data 833 within the running instance 834. Thus, as the program of the Gold image is placed into production, the running instance 834 becomes populated over time with user content data 833. In typical deployments, the amount of user content 833 is vast compared to the Gold image data 832 so that the running instance 834 mainly comprises user content data 833 over time. Thus, in the example of a database application, initially running instance 834 may be an empty database from Gold image copy 832' (which provides or acts like a template) and over time records are added as user content 833.

For many deployed programs and applications, it is common for updates or revisions to be generated at fairly regular intervals, such as at least once every few months. Such updates can involve wholesale replacement or significant revision of the original program code, such as for addition of new features, bug fixes, adaptation to new platforms, and so on. For the embodiment of FIG. 8, an update process 841 provides a new or modified Gold image 836 to replace the initial Gold image 832. Typically this updated Gold image 836 will be created and added to CDPT 840 some time after the Gold image 832, but this timing is not critical. The update process essentially involves an administrator issuing a new gold image 836 that supercedes the initial Gold image 832 so that the system can automatically update the running instance 834 as directed (e.g., automatically or explicitly by the administrator).

The update process 841 is performed by subtracting the bits of the original Gold image copy 832' and replacing them with the bits for the updated Gold image 836. Thus, as shown, A copy of the updated Gold image 836' is deployed into the running instance 834 to create a new running instance 838, which contains the copy of the updated Gold image 836' and the user content 833. User content 833 continues to be generated and processed by the program of the deployed updated Gold image 836'. This Gold image bit replacement process seamlessly updates the running instance for one Gold image to that of the updated Gold image.

For data protection purposes and as described above, the user content data 833 and associated running instances 834 and 838 can be stored in DPT 842 to maintain some separation of the other Gold image data and the user content data.

In an embodiment, the creation of new running instance 838 involves releasing the new Gold image 836 and updating an asset. In an embodiment, a user or administrator releasing a Gold image (initial or new) will add a tag named "SystemType" and assign it a value. At this time, the system (e.g., process 121) will automatically add a secondary tag named SystemTypeDate which will be set to the date/time that the Gold image was released and sent to the CDPT. FIGS. 9 and 10 are example tables showing, respectively, a Gold image library catalog and a deployed image catalog under an example embodiment. Table 900 of FIG. 9 illustrates certain example versions of components for each Gold image along with the defined tags. As shown in Table 900, the components (assets) include certain operating systems (Windows, Linux), SQL servers, and database programs (i.e., Oracle), for example. Each component in the component list 902 is tagged with a SystemType tag 904, and a corresponding date 906 indicating when the asset was stored in the CDPT. For the example of Table 900, the SQL Server 2008 component is tagged with the SystemType tag 'SQL_SERVER' and was stored in CDPT on May 12, 2010, and the SQL Server 2010 component that was stored in CDPT on Aug. 14, 2012 is also tagged with the SystemType tag 'SQL_SERVER.

In the example of FIG. 9, the SystemType="SQL_SERVER" and a secondary tag named SystemTypeDate which will be set to the time of when the Gold image is sent to the CDPT is automatically provided by the system upon release of the Gold image. At some point later, the user may certify a new SQL server Gold image using Windows Server 2015 and SQL Server 2012 and also assign it SystemType="SQL_SERVER." This new Gold Image will also be directed to the CDPT. As each Gold Image is used to deploy an asset, the tags SystemType and SystemTypeDate are propagated to the deployed asset using the values from the source Gold Image.

A user may assign a SystemType tag any time a program/application/dataset comprising a CDPT Gold image is changed by an update, revision, replacement, patch, bug fix, or any other defined event in the lifecycle of the program. Such events are typically initiated and provided in a data center environment by the vendor of the program or other third party. A user typically certifies or authorizes an update for use in their system to replace an older version. As part of this certification, the user assigns a SystemType tag to the Gold image data for this update. Alternatively, the system may automatically generate and assign a SystemType tag after receiving indication of approval by the user. The system may be configured to recognize Gold image data among defined types of Gold images or use the same SystemType tag among all versions of the same program. The user may be provided the opportunity to reject or revise any automatically tagged new Gold image data.

Process 121 uses tags associated with the Gold image data to automatically update the Gold image data from a previous version 832 to a later or current version 836 without requiring user interaction after validation of the update by the user. As shown in FIG. 9, Table 900 automatically generates and stores the date/time a Gold image or new Gold image is stored in the CDPT 840. The data in this table can be sorted and represented based on specific SystemType tags defined by the user. Table 920 of FIG. 10 illustrates some example assets associated with the SystemType tag "SQL_SERVER" and the SystemTypeDate for each of these assets. As shown in the example of FIG. 10, the SQL_Server asset underwent an update in August 2012 after an initial deployment of May 2010. The SystemType tags can comprise any format or name selected by the user or provided by the system, and the same tag should be used for related versions of the same program/application comprising the Gold image data.

Figure 11:
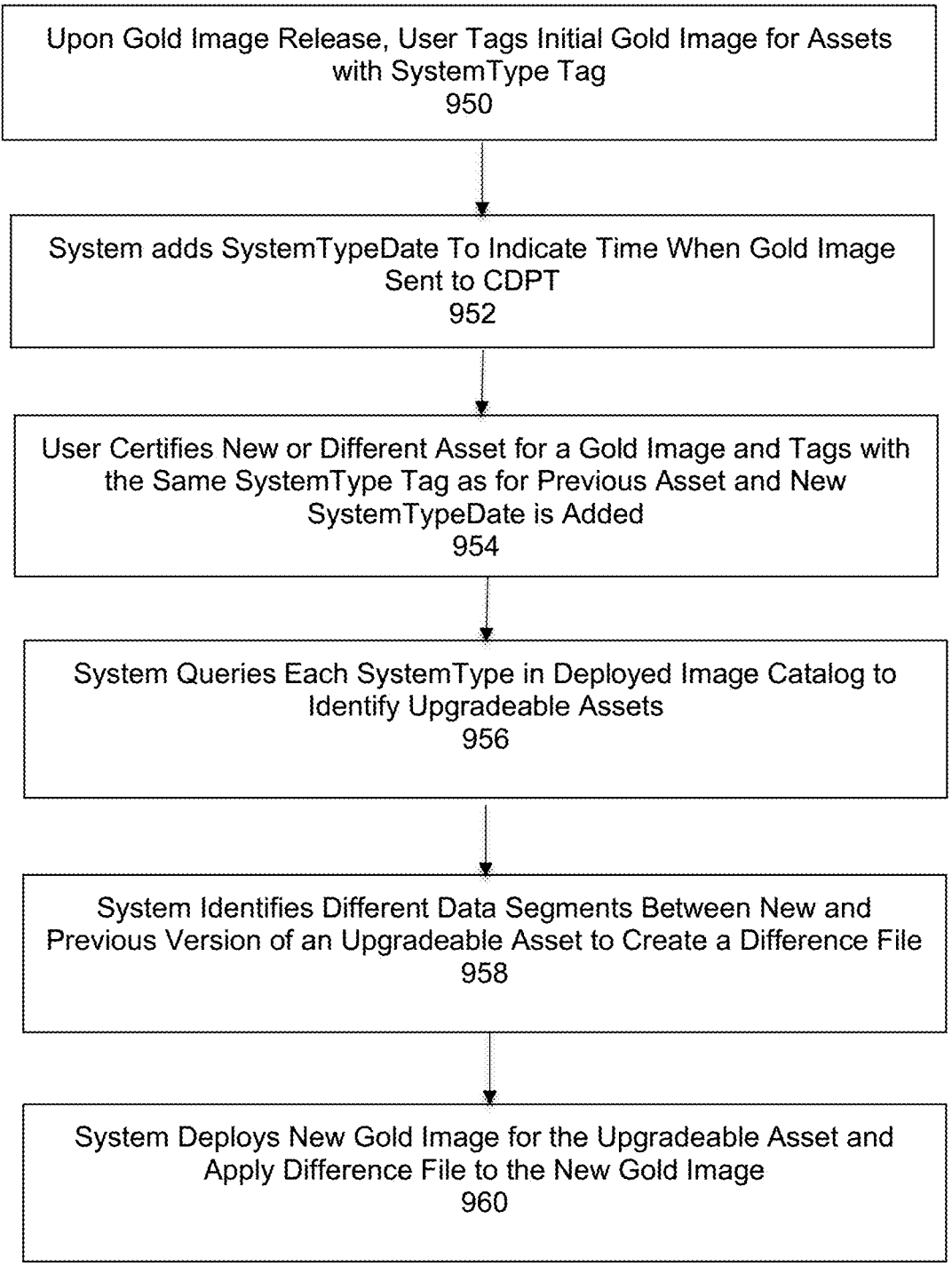
FIG. 11 is a flowchart illustrating a process of automatically updating assets using Gold images, under some embodiments.

FIG. 11 is a flowchart that illustrates a method of automatically upgrading assets using Gold image data, under some embodiments. As shown in FIG. 11, the user (or system) associates defined SystemType tags for Gold images stored in the CDPT, 950. Upon Gold imge release, the system adds the appropriate date/time information as a SystemTypeDate entry for the Gold image when it is stored in the CDPT, 952. For an updated or revised program/application that is provided or deployed for installation and use, the user certifies or validates the update and tags the Gold image data for the updated software with the same SystemType tag as the previous version, 954. In this step, the new SystemTypeDate is also added for the new Gold image. The update process is initiated by the user (system administrator). The automatic asset update process 121 will query each SystemType in the deployed image catalog, e.g., Table 920. Each SystemType that has a newer entry in the Gold image library catalog (e.g., Table 900) is upgradable, 956. In the example of FIGS. 10A and 10B, the user will be informed that the assets named production_sql_server, marketing_db and inventory_data can be automatically upgraded to Windows Server 2015 and SQL Server 2010. The upgrades of each of these systems may occur in series or in parallel.

Upon confirmation of update validation, the automatic asset update process 121 first determines the segments or "chunks" of the asset that differ between the initially deployed Gold image (e.g., May 12, 2010) and the current state of the image, 958. This different data comprises a differencing dataset for the updated program. Process 121 will then deploy the newer Gold image (e.g., Aug. 14, 2012) and then copy the differencing data to this new image, 960. Upon completion, the newly deployed Gold image will run the same user data (e.g., 833) using the newest version of the program or asset (e.g., SQL_SERVER) that has been certified by the customer. New user data 838 for this update will then be generated for storage to DPT 842, while the new Gold image data 836 is stored in the CDvPT 840, using techniques described above.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 12:
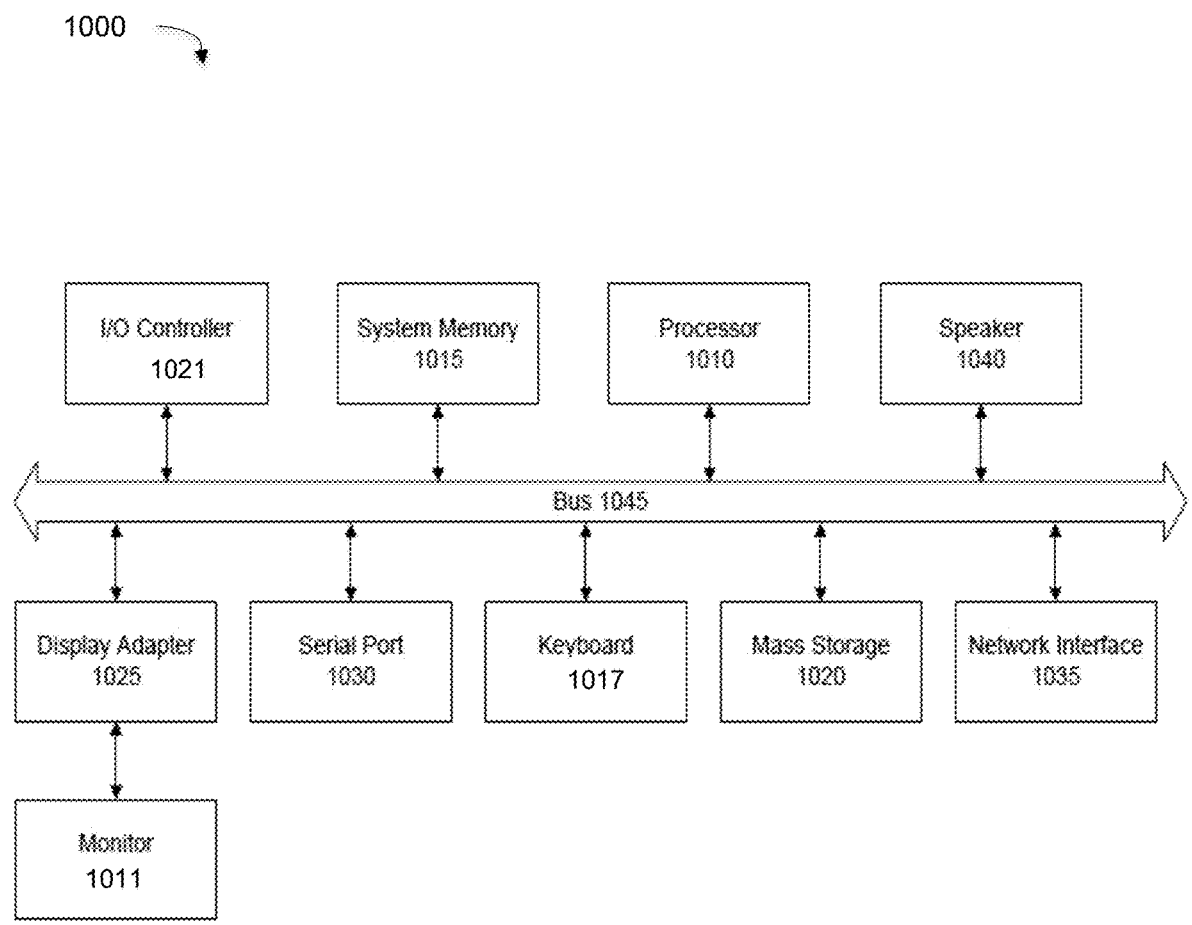
FIG. 12 is a system block diagram of a computer system used to execute one or more software components of a Gold image library management system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1000 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
providing a data protection (DP) target for storing user content data generated by one or more data sources deployed as clients running one or more operating system (OS) and application programs, and a common data protection target (CDPT) accessible to but separate from the data protection target;
copying, during a backup operation of a client, the user content data from the client to the DP target;
defining Gold image data as structural data for the one or more OS and application programs and comprising OS and application data defined by a manufacturer and different from the user content data;
receiving validation by a user for use of an updated program comprising new Gold image data, wherein the new Gold image data is stored in the CDPT and tagged with a defined tag related to a tag for Gold image data of a previous version of the updated program;
automatically updating the previous version with the updated program to generate new user content data, without requiring further user intervention;
maintaining a list of programs comprising Gold image data as separate entries in a Gold image library catalog;
associating a corresponding defined tag with each entry in the Gold image library catalog;
storing a date of storage of a Gold image in the CDPT as a corresponding entry for each entry in the Gold image library;
maintaining a deployed image catalog listing all systems and programs tagged with each defined tag with a respective date of storage; and
querying each defined tag in the deployed image catalog to identify programs with a newer storage date entry in the Gold image library as being upgradeable assets, and for each upgradeable asset: identifying data segments that differ between a version for the newer storage date and a version for a previous storage date to create a difference file for that asset, and deploying the updated program by applying the difference file to the new Gold image of the upgradeable asset.

2. The method of claim 1 wherein the defined tag comprises an alphanumeric string appended to the Gold image data to indicate an asset type of the upgradeable assets.

3. The method of claim 1 wherein the upgradeable assets comprise at least one of a: server computer, an operating system component, a virtual machine, or an application program.

4. A computer implemented method of automatically updating assets in a network, comprising:
- receiving a user assigned tag for a network asset implemented by Gold image data comprising structural data for one or more operating system or application programs defined by a manufacturer and different from user content data, wherein the Gold image data is stored in a central data protection target (CDPT) separate from a data protection target storing the user content data;
- associating a first date of storage in the CDPT for the Gold image data;
- receiving user validation of an updated asset to replace an original asset, wherein the updated asset comprises new Gold image data different from the Gold image data of the first date of storage;
- storing a new date of storage in the CDPT of the new Gold image data based on the user validation;
- automatically deploying an updated asset to the network by applying the new Gold image data for the updated asset to the Gold image data;
- maintaining a list of assets comprising Gold image data as separate entries in a Gold image library catalog;
- associating a corresponding user defined tag with each asset in the Gold image library catalog; and
- storing each date of storage of a Gold image in the CDPT as a corresponding entry for each asset;
- maintaining a deployed image catalog listing all assets tagged with each user defined tag with a respective date of storage in the CDPT; and
- querying each defined tag in the deployed image catalog to identify programs with a newer storage date entry in the Gold image library as being upgradeable assets, and for each upgradeable asset, identifying data segments that differ between a version for the newer storage date and a version for a previous storage date to create a difference file for that asset to deploy the updated asset.

5. The method of claim 4 wherein the updated asset accesses and processes original user content data generated by the original asset and generates new user content data through the new Gold image data, and wherein the original user content data and new user content data are stored in the data protection target.

6. The method of claim 4 wherein the defined tag comprises an alphanumeric string appended to the Gold image data to indicate an asset type of the upgradeable assets, and wherein the upgradeable assets comprise at least one of a: server computer, an operating system component, a virtual machine, or an application program.

7. A computer implemented method of automatically updating assets in a network, comprising:
- implementing each asset through Gold image data comprising structural data for one or more operating system or application programs defined by a manufacturer and different from user content data;
- storing the Gold image data in a central data protection target (CDPT) and the user content data in a data protection target separate from CDPT;
- maintaining a list of assets comprising Gold image data as separate entries in a Gold image library catalog;
- associating a corresponding user defined tag with each asset in the Gold image library catalog, and a date of storage of a Gold image in the CDPT as a corresponding entry for each asset; and
- maintaining a deployed image catalog listing all assets tagged with each user defined tag with a respective date of storage in the CDPT, wherein the user defined tag comprises an alphanumeric string appended to the Gold image data to indicate an asset type of the assets as upgradeable assets, and wherein the upgradeable assets comprise at least one of a: server computer, an operating system component, a virtual machine, or an application program.

8. The method of claim 7 further comprising querying each defined tag in the deployed image catalog to identify programs with a newer storage date entry in the Gold image library as being upgradeable assets.

9. The method of claim 8 further comprising, for each upgradeable asset identifying data segments that differ between a version for the newer storage date and a version for a previous storage date to create a difference file for the asset.

10. The method of claim 9 further comprising deploying the upgradeable asset by applying the difference file to a new Gold image of the upgradeable asset.

11. The method of claim 10 wherein the upgradeable asset accesses and processes original user content data generated by an original asset and generates new user content data through the new Gold image data, and wherein the original user content data and new user content data are stored in the data protection target.

* * * * *